United States Patent

[11] 3,626,927

| [72] | Inventor | James C. Breneman |
| | | 10571 Miller Drive, Galesburg, Mich. 49053 |
| [21] | Appl. No. | 33,626 |
| [22] | Filed | May 1, 1970 |
| [45] | Patented | Dec. 14, 1971 |

[54] REFLEX HAMMER
5 Claims, 5 Drawing Figs.

| [52] | U.S. Cl. | 128/2 R |
| [51] | Int. Cl. | A61b 05/16 |
| [50] | Field of Search | 128/2 R |

[56] References Cited
UNITED STATES PATENTS

| 2,685,286 | 8/1954 | Torricelli | 128/2 R |
| 2,744,520 | 5/1956 | Torricelli | 128/2 R |
| 2,800,895 | 7/1957 | Torricelli | 128/2 R |

*Primary Examiner*—Hugh R. Chamblee
*Attorney*—Woodhams, Blanchard and Flynn

ABSTRACT: A method for causing a reflex action in a foot by striking the Achilles tendon so that a part of the foot passes through light directed from a source at a photosensitive device and thereby produces a signal which is converted into a linear trace accurately indicating the movement of the foot.

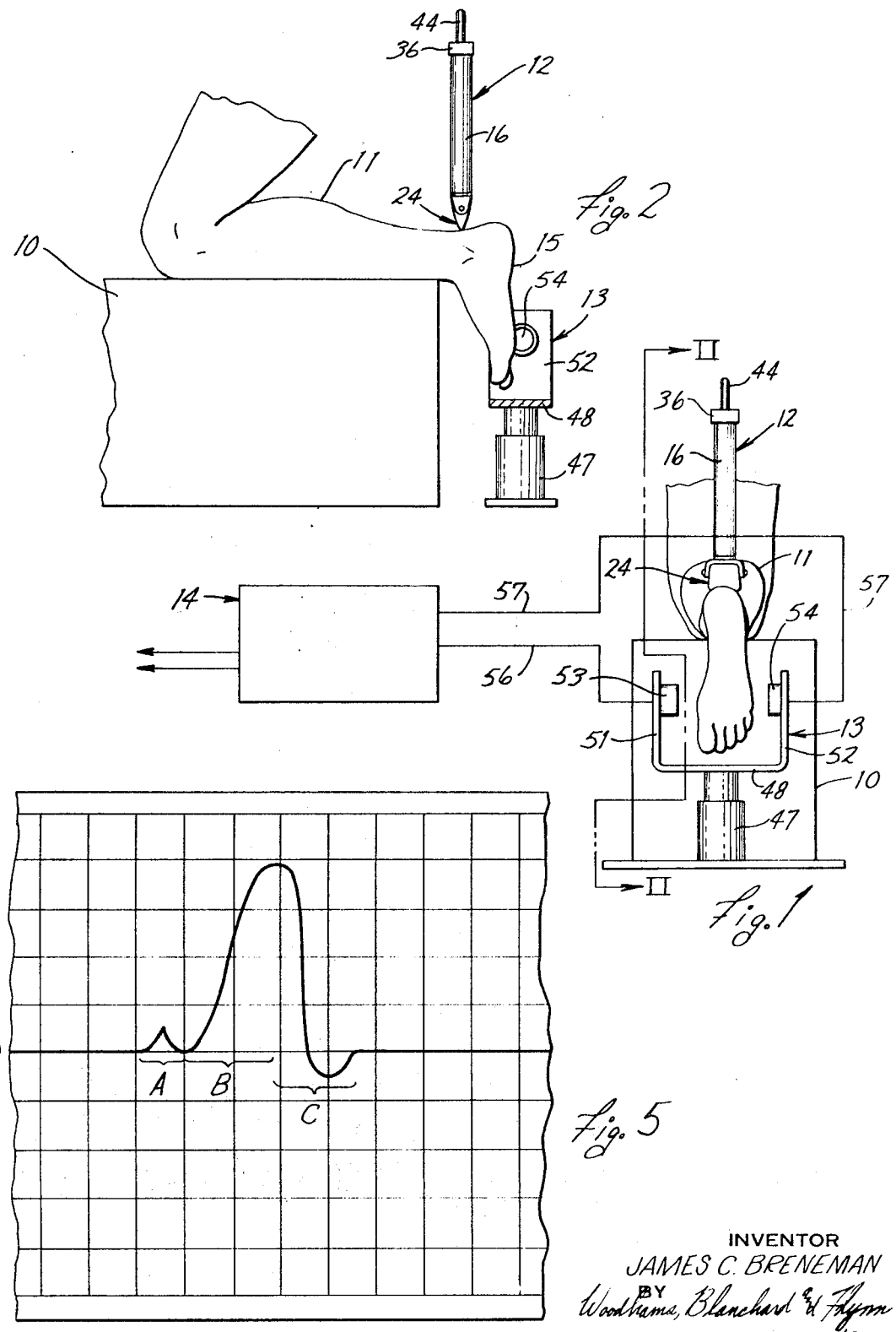

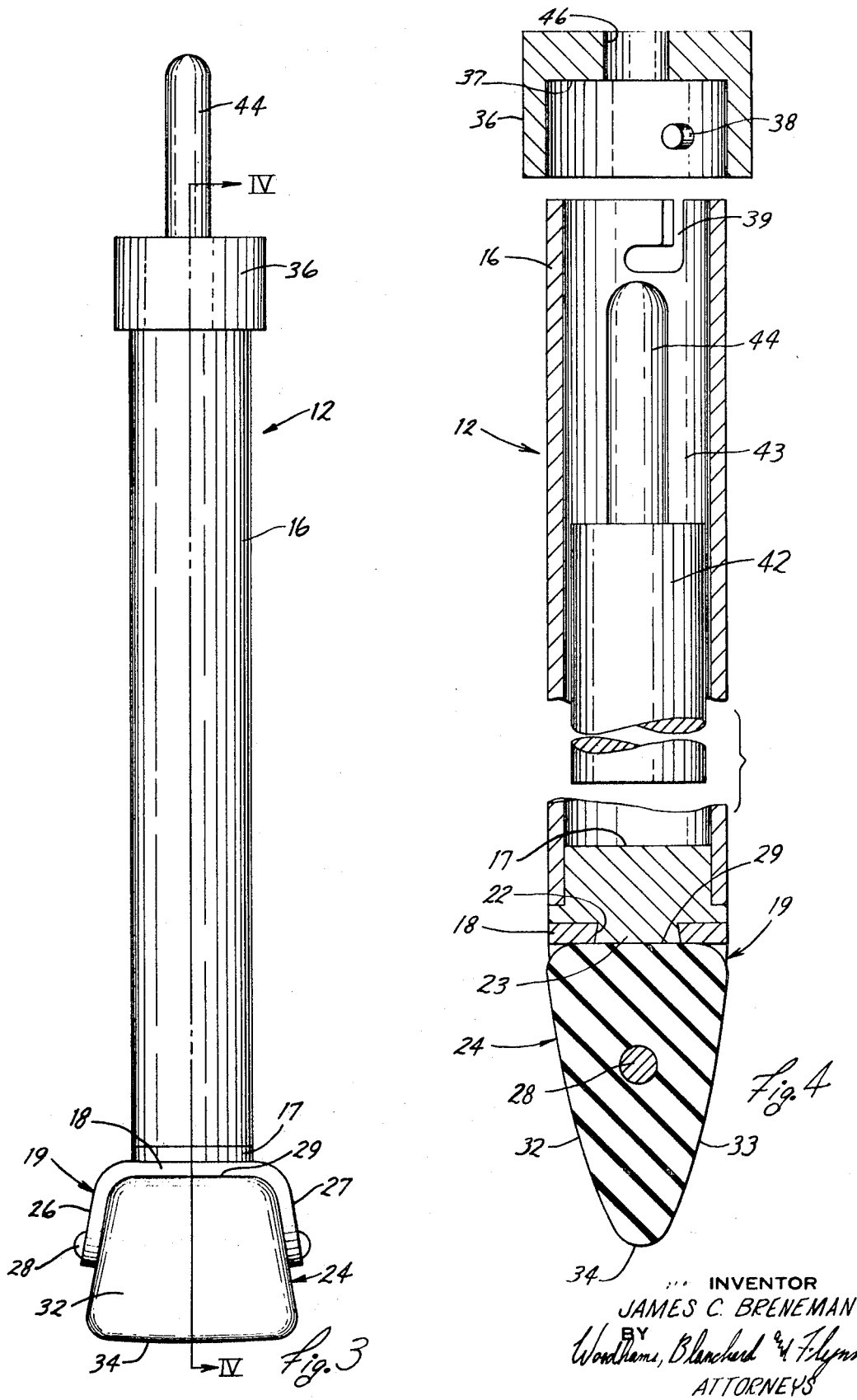

3,626,927

REFLEX HAMMER

BACKGROUND OF THE INVENTION

This invention relates in general to a method for accurately causing, detecting and recording the reflex action of a portion of the body of a mammal, such as the foot of a human patient, and more particularly, to a method utilizing a device capable of applying repeatedly an accurately predetermined amount of force to a selected portion of said body and a second device for accurately detecting and recording the amount of reflex motion produced by each application of the force.

It is well-known and established in the practice of medicine to apply an abrupt force at a particular location on a human body so that an adjacent part of such body is moved by reflex action in response to the force which is usually created by striking said location with a small mallet. For example, it is common medical practice to strike the Achilles tendon with a small, rubber-headed hammer which causes the foot to move in a well-known manner. Such a test is used to check on thyroid activity or to determine the affects of treatment of certain syndromes which manifest themselves by a reduced reflex action in related parts of the patient.

Heretofor, the accuracy in the results of the methods of conducting such tests have been severely limited by the lack of control in the methods used. That is, for example, the force applied to create the reflex action has been manually controlled, both in magnitude and location, so that even the most skilled physician could not guarantee that the force which he would apply would be the same from stroke to stroke and much less from day to day or from week to week. Thus, even though some attempts were made to record the reflex movements thus produced, the results of successive tests could not be accurately compared since they were not accurately reproduced. That is, the doctor could visually determine the results of the test with almost as much accuracy as he could by studying recordings of the reflex movements of the foot as a result of the forces applied.

Accordingly, a primary object of this invention is the provision of a method and apparatus for causing, detecting and accurately recording the movement produced by a reflex action in a part of the body of a human patient wherein a predetermined force can be applied repeatedly in precisely the same location on the body in order to produce the reflex action.

A further object of this invention is the provision of an apparatus, as aforesaid, whereby minor changes in reflex action can be accurately recorded and compared even though the period between the checking of such reflex actions is in excess of several months.

Other objects and purposes of the invention will become apparent to persons familiar with this type of subject matter upon reading the following descriptive material and examining the accompanying drawings in which:

FIG. 1 is a front elevational and partially schematic view of said apparatus for carrying out said method.

FIG. 2 is a broken sectional view substantially as taken along the line II—II in FIG. 1.

FIG. 3 is a side elevational view of a device for applying the force which produces the reflex action.

FIG. 4 is a broken, exploded and sectional view taken along the line IV—IV in FIG. 3 with the impact member in a different position of operation.

FIG. 5 is a fragment of a printout illustrating a recording of the signal generated by the apparatus as a result of the reflex action.

For convenience in description, the terms "upper," "lower" and words of similar import will have reference to the apparatus of the invention and parts thereof as appearing in FIGS. 1, 2 and 3. The terms "inner," "outer" and derivatives thereof will have reference to the geometric center of said apparatus and parts thereof.

SUMMARY OF THE INVENTION

The objects and purposes of the invention, including those set forth above, have been met by providing a method and apparatus whereby an accurately repeatable force can be reapplied at precisely the same location on the body of a human patient for the purpose of producing a reflex action, the movement of which is accurately detected and accurately recorded as a visible linear trace so that successive tests of such reflex action can be accurately compared for improvement or deterioration.

DETAILED DESCRIPTION

The apparatus which embodies the invention and by which the method of the invention can be carried out, as shown in FIG. 1, is comprised of a base 10 upon which the shin of the patient's leg 11 is rested so that the foot 15 projects beyond the edge of the base. The apparatus also includes a force producing device 12, a detecting device 13 and a signal receiving and recording device 14.

The force producing device or hammer 12 (FIGS. 3 and 4) includes a cylindrical tube 16 which is preferably fabricated from a rigid material, such as steel or plastic. In this embodiment, the tube 16 is approximately 12 inches long, 1⅛ inches in outside diameter and ⅞ inch in inside diameter. The tube 16 has a closed lower end wall 17 which is relatively thick and is rigidly secured to or integral with the lower end of the tube 16. Said end wall 17 is preferably fabricated from a durable metal, but could be a hard plastic.

The web 18 of a yoke 19 has an opening 22 (FIG. 4) defined by a downwardly diverging wall. A downwardly diverging projection 23 on the bottom of the wall 17 is snugly received into said opening 22, so that the projection 23 is rigidly locked with respect to the web 18. A resiliently flexible head 24, which is preferably fabricated from a relatively firm but resilient rubber, is disposed between the downwardly extending flanges 26 and 27 of said yoke 19. Said head 24 is held within said yoke 19 by a pin 28 which extends through appropriate openings in the flanges 26 and 27 and in the head 24.

The head 24 has a flat upper surface 29 which bears against the web 28 and thereby retains the head member 24 in a substantially fixed position with respect to the yoke 19, hence, the tube 16. The sides 32 and 33 of the head 24 converge downwardly, as do the edges of the flanges 26 and 27, and said sides 32 and 33 merge into a transversely arcuate edge 34 at the lower end of the head 24. This edge 34 is placed against the portion of the leg 11, for example, adjacent the foot 15 where the application of a force is desired.

The upper end of the tube 16 (FIG. 4) is closed by a removable cap 36 having an end wall 37. The cap 36 is held in position on the upper end of the tube 16 by means of a pin 38 which extends radially, inwardly from the sidewall of the cap 36 for engagement with an L-shaped slot 39 in the upper end of the tube 16.

An elongated, cylindrical impact member 42 is preferably made from a dense material, such as steel, and is slidably disposed within the chamber 43 defined by the tube 16. In this particular embodiment, the impact member 42 is approximately 4 inches long and weighs approximately 7¾ ounces. The impact member 42 includes an integral, preferably coaxial, rod 44 which projects upwardly from the upper end thereof. An opening 46 is provided in the end wall 37 of the cap 36 for slidably receiving the rod 44 therethrough so that said rod can be manually gripped to releasably hold the impact member 42 in its raised position (FIG. 3).

Preferably, the rod 44 is gripped between the thumb and the forefinger while the remaining fingers press the upper end of the tube 16 against the palm of the same hand. Thus, the force producing device 12 can be supported by the same, single hand which also holds the impact member 42 in the raised position.

The detecting device 13 includes a pedestal 47 having a U-shaped upwardly opening bracket 48 secured to the upper end thereof so that the legs 51 and 52 project upwardly from the pedestal 47. A photosensitive device 53 is mounted upon the inner face of the leg 51 so that it faces the leg 52. A light source 54 is mounted upon the leg 52 so that the radiation therefrom is directed toward the photosensitive device 53. The photosensitive device 53 and light source 54 are connected by the conductors 56 and 57, respectively, to the recording device 14 which may be a conventional electrocardiograph. Accordingly, any change in the intensity of the light from the source 54 impinging upon the photosensitive device 53 can be accurately recorded by the device 14 in the form of a linear trace which, in this particular embodiment, will be substantially as appearing in FIG. 5.

OPERATION

The operation of the above-disclosed apparatus will be apparent to persons skilled in this art upon reading such disclosure. However, the operation will be summarized briefly hereinafter for convenience.

The leg 11 of the patient (FIGS. 1 and 2) is placed upon the base 10 so that the foot 15 is unobstructed and points downwardly beyond the edge of the base 10. That is, the foot 15 is free to move around a horizontal axis through the ankle of the leg 11 in a normal and natural manner. The detecting device 13 is then placed adjacent the base 10 so that the sole of the foot 15 projects slightly into the edge of the light beam projected by the light source 54 upon the photosensitive device 53.

The force producing device 12 is positioned so that the lower edge 34 of the head 24 is in precisely the proper position with respect to the Achilles tendon to produce the desired reflex action. The precise location can be marked on the leg for subsequent tests. The impact member 42 is moved into its position of FIG. 3 by inverting the device until the rod 44 (FIG. 4) slides through the opening in the cap 36 so that it can be manually grasped.

With the force producing device 12 in its upright position of FIG. 2, the rod 44 is released whereupon the impact member 42 moves downwardly under the force of gravity until it strikes the end wall 17 (FIG. 4). The force thus produced is transmitted through the end wall 17, the yoke 19 and the head 24 to that portion of the leg 11 engaged by the edge 34.

The portion of the curve in FIG. 5 marked "A" results from the actual physical movement of the foot 15 produced the impact force transmitted by the device 12 to the leg 11. The part of the curve marked "B" represents the movement of the foot 15 resulting from the reflex action of the Achilles tendon. The part of the curve in FIG. 5 identified by the letter "C" represents the recovery of the foot to its normal position of rest. It will be noted that part of this recovery includes a slightly reverse direction of movement, which is created when the foot 15 moves completely out of the light beam. It is important that a slight reverse movement be recorded in the readout because, otherwise, the doctor could not be sure that all of the reflex action had clearly been detected and recorded. This is accomplished, as stated above, by initially placing the foot 15 so that it slightly blocks the path of the light from the source to the photosensitive device.

In the readout of FIG. 5, the horizontal axis is time and the vertical axis represents movement. Thus, it will be seen that repeated tests can be made and compared either successively or at intervals of time and the accuracy of such tests is virtually assured. Moreover, the doctor can experiment with the location for the head 24 of the force producing device 12 in a series of successive tests and readouts until he is reasonably certain that he has found the point at which he obtains the maximum reflex action. In this manner, tests separated by periods of time can be based upon the maximum reflex action produced during any given sequence of tests conducted for this purpose.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus for testing the reflex action of a limb of a patient, said apparatus including means responsive to movement of said limb for recording such movement, the combination comprising:
   an elongated, tubular member having a closed end;
   a resiliently flexible head member secured to and held against the closed end of said tubular member, said head member being relatively firm;
   a cap member removably mounted upon and thereby closing the end of said tubular member remote from the closed end thereof, said cap member having an opening extending therethrough in a direction substantially parallel with the lengthwise extent of the tubular member; and
   an impact member disposed within and freely movable lengthwise of said tubular member, said impact member having an elongated handle connected thereto and slidably receivable through the opening in said cap member for manual engagement whereby said impact member can be held adjacent the cap member, said impact member being fabricated from dense material so that when said head member is placed against said limb with said tubular member in an upright position, movement of said impact member from adjacent said cap member to a position of engagement with said closed end by action of gravity will cause said head member to press against said limb with a predetermined force.

2. An apparatus according to claim 1, wherein said head member has a pair of sidewalls which converge away from said tubular member, the outer edge of said head member being relatively narrow and transversely arcuate; and wherein said impact member is an elongated solid cylinder and the manually engageable element thereon is coaxial therewith, the opening in said cap member being coaxial with said tubular member.

3. An apparatus for testing the reflex action of a human limb, comprising:
   a base for supporting the limb in a predetermined position;
   an elongated tubular member having a closed end and a resiliently flexible head member snugly adjacent said closed end and adapted to engage said limb at a predetermined location thereon;
   an impact member slidably disposed within said tubular member, said impact member having engageable means for manually holding said impact member in a position within said tubular member remote from said closed end whereby release of said impact member when said tubular member is in an upright position will cause said impact member to strike said closed end under the force of gravity;
   means positioned near said base for detecting a movement of said limb caused by engagement of said impact member with said closed end;
   electromechanical means responsive to said detection means for producing a signal corresponding to the movement of said limb; and readout means for graphically recording said signal.

4. An apparatus according to claim 3, wherein said detecting means is a photoelectric device and said electromechanical means and readout means comprises an electrocardiograph.

5. A method of causing, detecting and recording the reflex action of an Achilles tendon, comprising the steps of:
   supporting the leg of a patient in a horizontal position so that the foot thereof points downwardly and freely from the leg;
   positioning a photosensitive device and a light source in spaced relationship so that the light path from said source to said photosensitive device is slightly blocked by the lower end of the bottom of said foot;

energizing said light source;
applying an abrupt force of a predetermined amount in a predetermined interval of time against the Achilles tendon of said foot whereby said lower end of said foot moves further into the path of said light source, whereby a signal is produced;
detecting said signal and converting said signal into a visible linear trace.

* * * * *